United States Patent
Jarvis et al.

(10) Patent No.: US 8,458,692 B2
(45) Date of Patent: Jun. 4, 2013

(54) SYSTEM AND METHOD FOR DATA MIGRATION INTEGRATION WITH INFORMATION HANDLING SYSTEM MANUFACTURE

(75) Inventors: Marc Jarvis, Belton, TX (US); Shaofei Chen, Austin, TX (US); Kevin Hanes, Round Rock, TX (US); Jefferson Raley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2948 days.

(21) Appl. No.: 10/952,073

(22) Filed: Sep. 28, 2004

(65) Prior Publication Data

US 2006/0075400 A1    Apr. 6, 2006

(51) Int. Cl.
  *G06F 9/445* (2006.01)
  *G06F 9/44* (2006.01)
  *G06F 15/177* (2006.01)
  *G06F 3/00* (2006.01)
  *G06F 13/00* (2006.01)

(52) U.S. Cl.
  USPC ............. 717/176; 717/175; 717/121; 710/33; 709/220

(58) Field of Classification Search
  USPC ............. 717/121, 168–178; 707/204; 725/80
  See application file for complete search history.

(56) References Cited

U.S. PATENT DOCUMENTS

| | | | |
|---|---|---|---|
| 5,091,849 A | 2/1992 | Davis et al. | 395/100 |
| 6,080,207 A | 6/2000 | Kroening et al. | 717/11 |
| 6,625,622 B1 * | 9/2003 | Henrickson et al. | 717/169 |
| 6,795,835 B2 * | 9/2004 | Ricart et al. | 707/204 |
| 7,072,919 B2 * | 7/2006 | Sexton et al. | 707/206 |
| 7,124,143 B2 * | 10/2006 | Matsunami et al. | 707/101 |
| 2002/0178233 A1 * | 11/2002 | Mastrianni et al. | 709/217 |
| 2004/0128203 A1 * | 7/2004 | Pierre et al. | 705/26 |
| 2005/0125281 A1 * | 6/2005 | Henrickson et al. | 705/10 |

* cited by examiner

*Primary Examiner* — Li B Zhen
*Assistant Examiner* — Ryan Coyer
(74) *Attorney, Agent, or Firm* — Terrile, Cannatti, Chambers & Holland, LLP; Robert W. Holland

(57) ABSTRACT

Data migration from existing to replacement information handling systems is integrated with manufacture of the replacement information handling system by including a data migration application and rules in the image copied to the replacement information handling system during manufacture. The rules define the data migration, such as the types of files allowed and disallowed for data migration, the physical interface for the data migration, the initial power up and display interface to support the data migration application and the deletion of the data migration application after completion of the data migration operation. The replacement information handling system ships to the end user and initiates the data migration application on power-up to present instruction to perform the data migration.

19 Claims, 2 Drawing Sheets

SYSTEM AND METHOD FOR DATA MIGRATION INTEGRATION WITH INFORMATION HANDLING SYSTEM MANUFACTURE

BACKGROUND OF THE INVENTION

1. Field of the Invention

The present invention relates in general to the field of information handling system manufacture, and more particularly to a system and method for data migration integration with information handling system manufacture.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems offer users tremendous flexibility by allowing users to select systems with desired hardware and software components that meet the user's specific needs. For instance, with build-to-order manufacture of information handling systems users select desired components before manufacture, such as by interfacing with the manufacturer's web site. Once the information handling system is built it is shipped to the user. Businesses often take advantage of the build-to-order manufacture of their information handling systems to ensure compatibility across the business or a network as well as the selection of components to provide a desired capability for employees. For instance, businesses will often specify software components to be loaded on manufactured information handling systems and, indeed, often create images that are provided to the information handling system manufacturer for copying to hard disc drives of systems manufactured for the business. For example, end users are able to define applications within an image by interfacing with an image management site of a manufacture. The image management site generates an image that is promoted to the factory for copying of the image to manufactured information handling systems. Imaged information handling systems arrive at the business ready to interact in the business environment complete with desired software and configuration settings, such as network settings.

In order to take advantage of continued improvements in information handling system technology and to ensure adequate reliability, businesses will periodically purchase replacement information handling systems to replace older operational systems. Although the images loaded on the replacement information handling system will generally prepare the replacement to enter the desired business and network environments, images generally do not include data stored on the original information handling system that is being replaced. Often employees store information locally that is critical to their job performance; sometimes employees have personal information stored that violates business rules, such as MP3 music or unlicensed software. In order to transfer data from an original to a replacement system, a technician typically runs a data migration tool, such as DesktopDNA, Aloha Bob, or InteliMover, on the information handling system using an appropriate rules template. The process of performing data migration on a system-by-system basis is time consuming, resulting in higher technician costs and delays implementing replacement systems. Further, data migration by technicians potentially exposes sensitive information to unauthorized individuals.

SUMMARY OF THE INVENTION

Therefore a need has arisen for a system and method which automates data migration from existing information handling systems to replacement information handling systems.

In accordance with the present invention, a system and method are provided which substantially reduce the disadvantages and problems associated with previous methods and systems for migrating data to replacement information handling systems. A data migration application is integrated with an image copied at manufacture of the replacement information handling system along with rules for performing the data migration so that the replacement information handling system ships to an end user prepared to accept data migrated from an existing information handling system.

More specifically, an image management site accepts end user image definitions, including a data migration application integrated in the image. A data migration engine obtains data migration rules defined by the end user and associates the rules with the data migration application. An image engine generates an image based on the end user inputs with the image including the data migration application and associated rules. The rules establish the nature of the data migration, such as the physical interface for the communication of data from an existing to a replacement information handling system, the types of files allowed or disallowed in the data migration process, the initial interface used to support the data migration and the deletion of the data migration application after completion of the data migration. The image is promoted to the factory for copying to replacement information handling systems after assembly of hardware components. The manufactured replacement information handling system ships to the end user where, at initial power-up, the system powers up to display a user interface that provides instructions for performing data migration with the data migration application. Upon completion of the data migration, a delete module deletes the data migration application and reboots the replacement information handling system to the primary operating system and applications for interaction with the end user environment.

The present invention provides a number of important technical advantages. One example of an important technical advantage is that replacement information handling systems arrive at an existing information handling system location configured to perform data migration. Upon power-up of the replacement information handling system, a user interface automatically provides instructions to perform the data migration, thus eliminating the delays associated with loading and configuring the data migration application. Automated initiation of the data migration application simplifies the data migration process so that less-technically adept end users may perform the data migration operation. Upon completion of the data migration, the data migration application automatically deletes and boots to the primary operating system to quickly allow the end user to interact with the replacement information handling system in end user environment.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Data migration from an existing to a replacement information handling system is more effectively managed by integration of a data migration application at manufacture of the replacement information handling system. The replacement information handling system ships from the manufacturer to the end user with the data migration application configured to migrate data from the existing information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
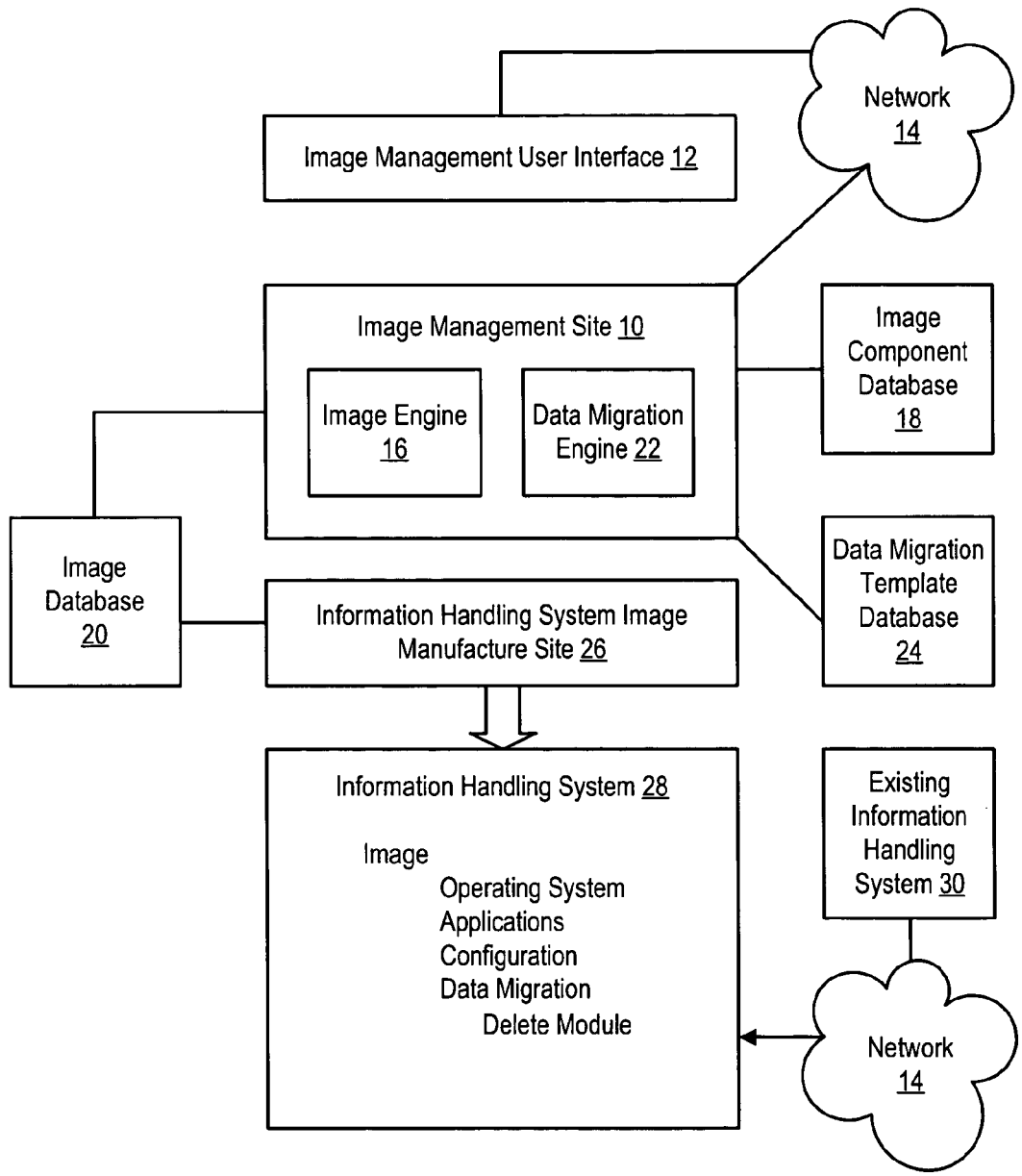
FIG. 1 depicts a block diagram of a system for integration of data migration with manufacture of a replacement information handling system.

Referring now to FIG. 1, a block diagram depicts a system for coordinating data migration from an existing information handling system to a replacement information handling system by integration of the data migration application during manufacture of the replacement information handling system. An information technology administrator of an end user interfaces with an image management site 10 through an image management user interface 12 and network 14, such as the Internet. An image engine 16 creates an image defined through image management user interface 12 from an image component database 18 and stores the image to an image database 20 for promotion to the manufacturer factory environment. For instance, image component data base 18 includes various operating systems and applications that the end user may select for inclusion in an image, such as the WINDOWS or Linux operating systems and the OFFICE suite of applications. In some instances, image component database 18 includes applications specific to a particular end user, or even pre-configured images. Image engine 16 allows the end user to configure the components in a desired manner, such as with appropriate network settings or other configuration information.

Among the components available in image component database 18 are data migration applications, such as Desktop DNA, Aloha Bob and Intelimover. If an end user selects a data migration application for inclusion in an image, a data migration engine 22 interfaces with image management user interface 12 to present a form for the end user to specify the rules that the data migration software will use once the information handling system arrives at the end user. For instance, each data migration application has an associated data migration template available in a data migration template database 24 that defines rules for the data migration from an existing information handling system 30 to a replacement information handling system 28. Data migration engine 22 obtains information to complete the appropriate template from image management user interface 12 and includes the completed template with the data migration application in the image. For instance, the rules defined by the template may include types of files that are allowed or prohibited in the migration, such as prohibiting unauthorized personal files like MP3 music files, and the type of interface used between the existing and replacement information handling systems, such as a network-based interface or a peer-to-peer direct connection like with a USB cable. Other configuration rules manage the type of operating system used to run the data migration application and the deletion of the data migration application after completion of data migration. Deletion of the data migration application after completion of the data migration operation reduces the expense to end users by allowing a single use license of the data migration application. In one embodiment, the templates are filled with a default set of rules that the end user may adjust.

Once an image having a data migration application and associated template is stored in image database 20, an information handling system image manufacture site 26 retrieves the image for copying to information handling systems 28 after assembly of the hardware components. The image includes the image components, such as the operating system, applications and configuration information selected by the end user. The data migration application is included with the rules template that defines the data migration functions performed by the application. For instance, the data migration application is called upon initial power up of the information handling system and a delete module deletes the data migration application after completion of the data migration. Replacement information handling system 28 ships to the end user location to interface with existing information handling system 30 for performing data migration. Upon initial power-up, the system boots to the data migration application which displays instructions for interfacing with the existing information handling system and performing the data migration. Upon completion of data migration, the delete module deletes the data migration application and reboots to the primary operating system and applications for normal use.

Figure 2:
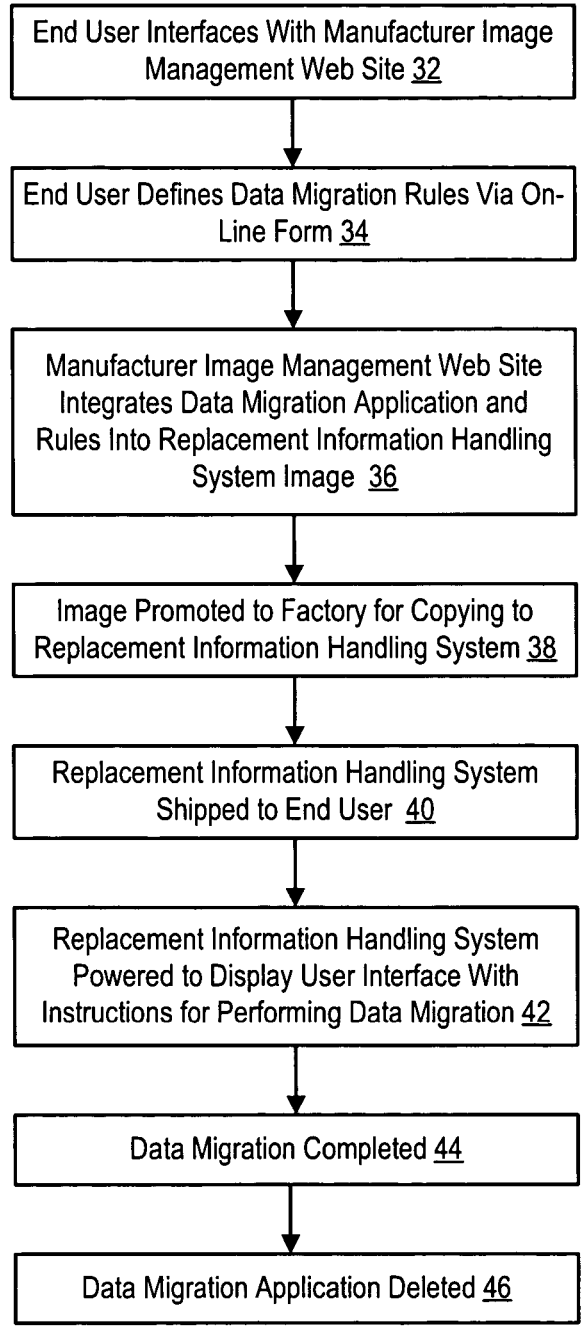
FIG. 2 depicts a process integration of data migration with manufacture of a replacement information handling system.

Referring now to FIG. 2, a flow diagram depicts a process for integration of data migration with manufacture of a replacement information handling system. The process begins at step 32 by end user interaction with a manufacturer image management site to select a data migration application for inclusion in an image. At step 34, the end user defines data migration rules via an on-line form, such as a template accepting information associated with performance of data migration by the application. At step 36, the manufacturer image management site integrates the data migration application and defined rules into a replacement information handling system image. At step 38, the image is promoted to the factory for copying to replacement information handling systems as the hardware components are assembled. At step 40, the completed replacement information handling systems are shipped to the end user and, at step 42, powered-up to boot to a display that provides instructions for performing data migration, such as how to connect the replacement and existing information handling systems and an icon to initiate data migration once the physical interface is established. At step 44, the data migration is completed and, at step 46, the data migration application is deleted to power-up to the primary operating system for use in the end user environment.

Although the present invention has been described in detail, it should be understood that various changes, substitutions and alterations can be made hereto without departing from the spirit and scope of the invention as defined by the appended claims.

What is claimed is:

1. A system for coordinating data migration from an existing information handling system to a replacement information handling system, the system comprising:
   an image management network site associated with an information handling system manufacturer and operable to accept customer component selections that define an image for copying to manufactured information handling systems;
   an image engine associated with the image management network site operable to compile the selected components into an image, the selected components including a data migration application; and
   a data migration engine associated with the image management network site and operable to accept customer rule definitions for the data migration application to migrate data from the existing information handling system to the replacement information handling system, the rule definitions incorporated in the image, the data migration application operable to initiate at the replacement information handling system to migrate data from the existing information handling system according to the rule definitions.

2. The system of claim 1 further comprising:
   an information handling system image manufacture site interfaced with the image management site and operable to copy the image to plural information handling systems.

3. The system of claim 1 wherein the data migration application is further operable on initial power-up to display a user interface having instructions for performing the data migration over a communication link.

4. The system of claim 3 wherein the communication link comprises a local area network interface.

5. The system of claim 3 wherein the communication link comprises a cable connecting the replacement and existing information handling systems.

6. The system of claim 3 wherein the cable comprises a USB cable.

7. The system of claim 1 further comprising:
   a delete module associated with the data migration application and operable to automatically delete the data migration application from the replacement information handling system after migration of the data from the existing information handling system.

8. The system of claim 1 wherein the rule definitions comprise file types for which migration from the existing to the replacement information handling systems is prohibited.

9. The system of claim 8 wherein the prohibited file types comprise MP3 files.

10. A method for data migration from an existing information handling system to a replacement information handling system, the method comprising:
    creating an image having plural applications, the plural applications comprising a data migration application;
    copying the image to a replacement information handling system;
    shipping the replacement information handling system to an end user;
    powering up the replacement information handling system at the end user; and
    initiating the data migration application at the replacement information handling system to migrate data from the existing information handling system to the replacement information handling system;
    wherein initiating the data migration application further comprises automatically initiating the data migration application on initial power up to display a user interface.

11. The method of claim 10 further comprising:
    automatically deleting the data migration application after completing the data migration from the existing information handling system to the replacement information handling system.

12. The method of claim 10 further comprising:
    interfacing the end user with the creating of the image;
    defining rules for the data migration application to migrate data; and
    including the rules in the image.

13. The method of claim 12 wherein defining rules comprises excluding predetermined files from the data migration.

14. The method of claim 13 wherein the excluded files include MP3 files.

15. The method of claim 10 further comprising:
    migrating data from the existing to the replacement information handling system through a local area network.

16. The method of claim 15 further comprising:
    migrating data from the existing to the replacement information handling system through a peer-to-peer connection.

17. A method for data migration from an existing information handling system to a replacement information handling system, the method comprising:
    creating an image having plural applications, the plural applications comprising a data migration application;
    interfacing the end user with the creating of the image;
    defining rules for the data migration application to migrate data;
    including the rules in the image;
    copying the image to a replacement information handling system;
    shipping the replacement information handling system to an end user;
    powering up the replacement information handling system at the end user; and
    initiating the data migration application at the replacement information handling system to migrate data from the existing information handling system to the replacement information handling system.

18. The method of claim 17 wherein defining rules comprises excluding predetermined files from the data migration.

19. The method of claim 18 wherein the excluded files include MP3 files.

* * * * *